(12) United States Patent
Asmus et al.

(10) Patent No.: US 12,504,360 B2
(45) Date of Patent: Dec. 23, 2025

(54) SENSOR FOR DETECTING CONDUCTIVE PARTICLES

(71) Applicant: Yageo Nexensos GmbH, Kleinostheim (DE)

(72) Inventors: Tim Asmus, Kleinostheim (DE); Christoph Nick, Kleinostheim (DE); Karlheinz Wienand, Aschaffenburg (DE); Peter Pitzius, Kleinostheim (DE); Christian Lammarck, Kleinostheim (DE); Laura Leistenschläger, Kleinostheim (DE); Tobias Reising, Kleinostheim (DE)

(73) Assignee: Yageo Nexensos GmbH, Kleinostheim (DE)

( * ) Notice: Subject to any disclaimer, the term of this patent is extended or adjusted under 35 U.S.C. 154(b) by 287 days.

(21) Appl. No.: 18/250,005

(22) PCT Filed: Oct. 19, 2021

(86) PCT No.: PCT/EP2021/078872
§ 371 (c)(1),
(2) Date: Apr. 21, 2023

(87) PCT Pub. No.: WO2022/089984
PCT Pub. Date: May 5, 2022

(65) Prior Publication Data
US 2023/0400400 A1      Dec. 14, 2023

(30) Foreign Application Priority Data

Oct. 28, 2020 (EP) .................... 20204473

(51) Int. Cl.
*G01N 15/06* (2024.01)
*G01N 15/00* (2006.01)

(52) U.S. Cl.
CPC . *G01N 15/0656* (2013.01); *G01N 2015/0046* (2013.01)

(58) Field of Classification Search
CPC .................. G01N 15/0656; G01N 2015/0046
See application file for complete search history.

(56) References Cited

U.S. PATENT DOCUMENTS 9,696,249 B2    7/2017 Hedayat et al.
10,578,540 B2   3/2020 Kim
(Continued)

FOREIGN PATENT DOCUMENTS

CN      104380078      2/2018
CN      110998283      4/2020
(Continued)

*Primary Examiner* — David Z Huang
(74) *Attorney, Agent, or Firm* — Dicke, Billig & Czaja, PLLC (57) ABSTRACT

A sensor for detecting conductive particles in a gas flow, comprising a substrate having two front sides, wherein a gas flow direction is from a first front side to a second front side, wherein a resistive electrode structure comprising at least two electrodes is formed on the substrate, the at least two electrodes are electrically separated, wherein in relation to the gas flow direction, a first electrode is arranged in a first section of the sensor such that the first electrode acts as a suction electrode, wherein a sensor detection region is formed in a second section of the sensor, whereby the sensor detection region is formed by portions of the first electrode and a second electrode, wherein the second electrode is formed at least partially in a third section of the sensor.

12 Claims, 10 Drawing Sheets

(56) References Cited

U.S. PATENT DOCUMENTS

2008/0265870 A1* 10/2008 Nair .................. G01N 15/0656
324/105
2015/0168285 A1* 6/2015 Hedayat .............. G01M 15/102
73/23.33

FOREIGN PATENT DOCUMENTS

| | | |
|---|---|---|
| CN | 111094935 | 5/2020 |
| DE | 102017207800 | 11/2018 |
| DE | 10 2017 216046 A1 | 3/2019 |
| DE | 10 2018 251790 A1 | 7/2020 |
| EP | 2 860 510 A1 | 4/2015 |
| JP | 2016 217849 A | 12/2016 |
| WO | 2011/106625 A1 | 9/2011 |
| WO | 2018/115054 A1 | 6/2018 |

* cited by examiner

SENSOR FOR DETECTING CONDUCTIVE PARTICLES

FIELD OF THE INVENTION

The invention relates to a sensor for detecting conductive particles in a gas flow, comprising a substrate having a cuboid or cylindrical shape with front sides. Further, the invention relates to a sensor system comprising an inventive sensor in a housing. Further, the invention relates to the use of an inventive sensor or inventive sensor system.

BACKGROUND OF THE INVENTION

Different designs of particle sensors, especially soot sensors, are known from the state of the art. For example, in WO 2011/106625 A1 such a soot particle sensor is described, which is formed by two interdigitating electrodes. The soot particles in the exhaust gas flow settle on the surface of the soot particle sensor and bridge the two electrodes. With increasing soot coverage, the electrical resistance between the electrodes decreases. The measurement of the electrical resistance between the electrodes is a measure of the soot particle concentration in the measured exhaust gas stream.

WO 2018/115054 A1 also describes a sensor for the detection of electrically conductive and/or polarizable particles. An electrode layer is formed on a substrate. The electrode layer has at least two spatially separated and interlocking electrodes.

The shape of an electrode layer revealed in WO 2018/115054 A1 is produced, for example, by means of laser ablation steps. Due to the relatively complex shape of the electrodes, many successive laser ablation steps are necessary to produce the electrodes. The production of particle sensors known from the state of the art is therefore relatively complex.

Figure 1:
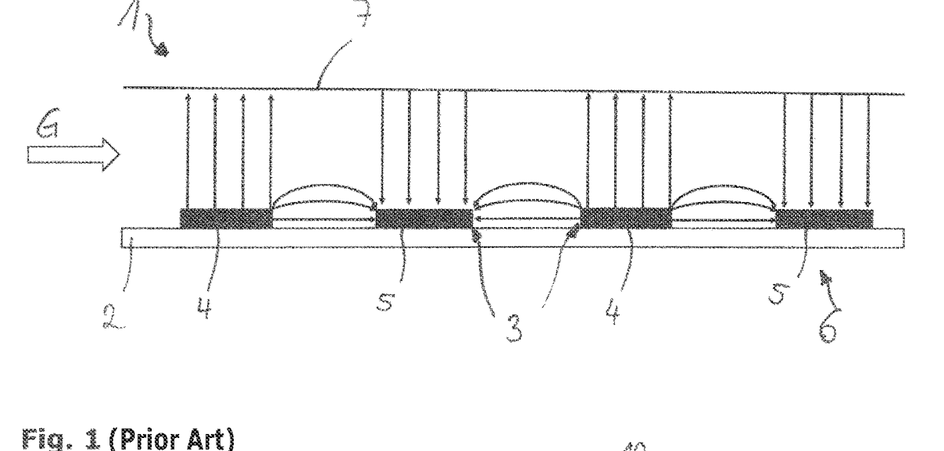
FIG. 1 shows a state-of-the-art sensor.

The sensor systems known from the state of the art are exemplarily shown in FIG. 1. FIG. 1 shows a side view of a state-of-the-art sensor system 1. An electrode system 3 is formed on a substrate 2. The electrode system 3 consists of two interdigitating electrodes 4 and 5, i.e. the fingers of a first comb electrode 4 and the fingers of a second comb electrode 5 are shown in the side view. The sensor 6 thus formed is located in a housing 7.

FIG. 1 shows the electrical field that is formed by the comb electrodes 4 and 5 and the housing 7. A charged particle flowing into housing 7 in the direction of the arrow G passes while traversing the interdigital capacitor structure (IDC) an electrical field that periodically changes direction. The net force acting on a charged particle towards the electrode structure or, depending on the sign of the charge, towards the housing is therefore relatively small compared to an electrode structure generating an unidirectional field.

Based on the aforementioned state of the art, it is the aim of the present invention to specify a further developed sensor for the detection of conductive particles which are easier to manufacture. However, the sensors shall have at least the same sensitivity and robustness as those known in connection with such sensors made of interdigital electrodes. Preferably, the sensitivity and robustness of the sensor should even be increased compared to the state of the art.

Furthermore, it is the task of the present invention to specify a further developed sensor system as well as a possible use of the sensor according to the invention.

SUMMARY OF THE INVENTION

According to invention, the said problem is solved with respect to a sensor by the subject matter of claim 1, with respect to a sensor system by the subject matter of claim 11 and with respect to a use of a sensor and/or a sensor system according to invention by the subject matter of claim 15.

The invention is based on the idea of specifying a sensor for detecting conductive particles in a gas flow, the sensor comprising a substrate having a cuboid or cylindrical shape with two front sides. A gas flow direction is defined as extending from a first front side towards a second front side. The sensor according to the invention has a resistive electrode structure. The resistive electrode structure has at least two electrodes and is formed on at least one surface of the substrate. The at least two electrodes are electrically separated from each other. A conductive particle is to be understood in particular as a charged particle.

The gas flow direction is in particular defined as extending in direction from a first front side of the substrate to a second front side of the substrate. A suction electrode is an electrode that can be switched in such a way that charged particles can be attracted.

According to the invention, a first electrode is arranged in relation to the gas flow direction in a first section of the sensor and is designed in such a way that the first electrode acts as a suction electrode.

A sensor detection region is formed in a second section of the sensor, the sensor detection region being formed by a portion of the first electrode and a portion of a second electrode spaced from the portion of the first electrode. The second electrode is formed at least in sections in a third section of the sensor.

In other words, the sensor can be divided into at least three sections. A first section, a second section and a third section are arranged in the direction of gas flow.

The sensor according to the invention is based on a resistive electrode system and a corresponding analysis or detection of electrical resistances to be detected.

In one embodiment of the invention, the resistive electrode structure is formed on only one surface of the substrate. Such an embodiment is known from the state of the art.

Furthermore, it is possible to form a resistive electrode structure on both sides of a substrate. Such an embodiment has the advantage that not only the particles flowing over a first sensor side are detected, but also the particles flowing along the further sensor side. Due to a resistive electrode structure on both sides of a substrate, the sensitivity of the sensor can be increased.

It is possible to contact the respective first electrodes of the two resistive electrode structures together or separately. Furthermore, it is possible to contact the respective second electrodes of the resistive electrode structures together or separately.

Such an embodiment, which includes two resistive electrode structures, is particularly suitable for a cuboid shape of a substrate. If the substrate has a cylindrical shape, a two-sided formation of a resistive electrode structure can be achieved if the substrate is hollow cylindrical.

The first electrode of the sensor is preferably the electrode that a particle first passes when the particle flows along the sensor. A charged particle, which is in the gas flow and has a charge opposite to the charge of the first electrode, is deflected towards the first electrode or electrostatically attracted by the first electrode when flowing over the first electrode.

The first electrode thus has two functions:

Due to its design as a suction electrode, the first electrode attracts charged particles with a polarity opposite to the first electrode. Due to the suction of such charged particles, the particle density on the first electrode is increased. Especially in the sensor detection region the particle density is increased.

Another function of the first electrode is to form a resistive sensor together with the at least second electrode. With the help of a resistive sensor, the particles deposited in the sensor detection region can be detected.

In an unexpected way, the inventive sensor with the design described above increases the sensitivity of the sensor.

In an embodiment of the invention, the structure of the first electrode in the first section of the sensor is to be understood as such that the complete first electrode in the first section is constructed as a suction electrode. In other words, in this case not only individual sections or partial areas of the first electrode act as a suction electrode, but the entire part of the first electrode positioned in the first section acts as suction electrode.

In particular, in such an embodiment of the invention, a single comb section or a single finger of a first electrode is not to be understood as a suction electrode.

In a further embodiment of the invention, the sensor has only a single sensor detection region, whereby this sensor detection region is formed in the second section of the sensor. In other words, in addition to the sensor detection region formed in the second section of the sensor, no further or additional sensor detection region is built in the sensor.

Preferably, there is no sensor detection region in the first section of the sensor. In other words, the suction electrode is preferably arranged in the first section and does not provide means for the resistive detection of charged particles, in particular charged soot particles.

There are various options to avoid forming of a sensor detection region in the first section of the sensor.

Firstly, it is possible not to form a second electrode or a section of the second electrode in the first section of the sensor.

Furthermore, it is possible to coat the electrodes formed in the first section of the sensor and the free spaces between them with a/the passivation layer. If a passivation layer is formed, it is not possible to detect conductive particles in this area even between adjacent electrodes.

A further possibility is to choose the distance between the two electrodes to be so large that no detection of conductive particles, especially soot particles, can be performed in the area of the adjacent electrodes or electrode sections. It is known that in order to detect conductive particles between two electrodes, it is necessary that the distance between the electrodes or the electrode sections is chosen in such a way that preferably particle filaments, especially soot filaments, are formed between the electrodes or the electrode sections.

Furthermore, it is possible to align the two electrodes parallel to the direction of the gas flow. Such an electrode design will suppress the formation of charged particle filaments between the electrodes.

The suction electrode is placed in front of the sensor detection region in view of the gas flow. Charged particles carried in the gas flow will be forced by the attracting potential of the suction electrode towards the suction electrode. The particles might land on the suction electrode and might be discharged there. The volatile particles on or slightly above the suction electrode will be purged by the gas flow towards the sensor detection region and contribute to a resistive change between first and second electrode.

The area covered by the suction electrode (ASE) is larger than the area between the first electrode and the second electrode in the sensor detection region (ADR). The ratio of ASE to ADR is at least 20, preferably at least 50, most preferably at least 100. A large ASE generates a large area and uniform electrical field that will force charged particles towards the suction electrode.

The suction electrode might cover uniformly a certain area of the substrate. However, it is also possible to intersect the uniform area by grooves or lines. The area formed by the intersections is considerably small compared to the area of the remaining suction electrode. Therefore, the intersections will not significantly alter the uniform electrical field generated by the suction electrode. Intersections might be advantageous to structure the suction electrode. Possible structures of the suction electrode formed by the intersections are e.g. U-shaped, meandering structures for heating elements or temperature sensors.

In addition, the inventive design of a sensor is much easier to manufacture than the electrode arrangements known from the state of the art. This applies especially to the interdigital capacitor structures known from the state of the art.

The application of the sensor according to the invention for the detection of charged particles is the same as with known resistive sensors. During a measuring cycle, the electrical resistance between the first electrode and the second electrode is determined as a function of time. This serves as a measure for the particle concentration in the gas flow. When the particle occupancy on the resistive electrode structure has reached a previously defined threshold value, the sensor, especially the resistive electrode structure, is cleaned during a regeneration cycle. This is done by heating the resistive electrode structure, for example. The conductive particles on top of the resistive electrode structure are removed again by heating. Afterwards a new measuring cycle can be started.

The first electrode and/or the second electrode is/are preferably designed as heating element.

In a further embodiment of the invention it is possible that the first electrode and/or the second electrode is/are coated in sections with a passivation layer, wherein at least the sensor detection region is formed free of the passivation layer. The formation of such a passivation layer has the advantage that such a sensor can be reliably used even at high temperatures and in corrosive gases.

In a particularly easy-to-produce embodiment of the invention, the first electrode and the second electrode are each formed as rectangular electrodes. This allows, for example, the application of the electrode structure by means of screen printing technology. Consecutive fine structuring of the electrodes, especially in the sensor detection region, can be done with an ablation laser.

In a further embodiment of the invention, the first electrode and the second electrode are arranged parallel to one another at least in sections, the second electrode embracing the first electrode transversely to the gas flow direction at least in sections. Preferably the second electrode embraces the first electrode at least in the third section of the sensor. Such an embracing of the first electrode causes the formation of a sensor detection region with, for example, a slit-shaped recess transverse to the gas flow direction.

The gap between the first electrode and the second electrode in the sensor detection region is oriented essential perpendicular to the gas flow direction and preferentially slit-shaped. The width of the gap is at most 200 μm, preferably at most 100 μm, most preferably at most 70 μm. The width of the gap is at least 10 μm, preferably at least 20 μm, most preferably at least 30 μm.

In a preferred embodiment the width of gap between the first electrode and the second electrode in the first section is at least 2 times, preferably 3 times, most preferably at least 4 times larger than the width of the gap between the first electrode and the second electrode in the sensor detection region. As a result this may prevent or reduce the detection of particles in the first section.

The first electrode can be rectangular or U-shaped. The second electrode can have an U-shape or a L-shape, for example.

In a further embodiment of the invention, the first electrode comprises structuring lines to structure the first electrode in connectedly areas, in particular a meander.

The design of the first electrode as a meander is particularly suitable if the first electrode is designed as a heating element. The first electrode can also be used as a temperature sensor, especially if the electrode is made of a material with a large temperature coefficient. In another embodiment of the invention, the sensor has at least a third electrode. The third electrode is formed between the first electrode and the second electrode or at least partially encloses the second electrode. A third electrode can serve as an auxiliary electrode that is addressed separately or that is electrically connected with the first electrode in order to optimize the suction effect on the conductive particles in the gas flow.

It is also possible that the first electrode and/or the second electrode has/have peaks in the sensor detection region. If both the first electrode and the second electrode have peaks in the sensor detection region, it is advantageous that the peaks of the two electrodes are opposite and facing each other.

By forming peaks in the sensor detection region a field enhancement can be generated. This serves to increase the sensitivity of the sensor. In an embodiment of the invention it is possible that a section of the first electrode in the sensor detection region and/or a section of the second electrode in the sensor detection region is/are structured by etching or by laser ablation in such a way that peaks are formed for field enhancement.

The described passivation layer is made of electrically insulating material and is produced, for example, by the screen printing or aerosol deposition method (ADM). Preferably, the passivation layer is a metal oxide layer or a glass layer. If the passivation layer is a glass layer, this glass layer can be applied in the form of a glass paste by screen printing on the electrode sections to be covered.

The sensor detection region can be free of the passivation layer at least in sections in such a way that only the end faces of the portions of the first electrode and the second electrode are free of a passivation layer.

In an equally suitable embodiment of the invention, the sensor detection region can be formed so that both the end faces of the portions of the first electrode and the second electrode and the surfaces of the electrode sections are partially exposed. Such an embodiment of the invention can improve the growth of particle filaments which are formed from the first electrode to the second electrode.

In a further embodiment of the invention, it is possible that the end faces of the portions of the first electrode and the second electrode are only partially free of passivation layer. The parts of the end faces, which are adjacent to or adjoin the substrate may, for example, be coated with a passivation layer. In this case, only the upward facing sections of the end faces of the first and second electrodes are free of the passivation layer.

In a further embodiment of the invention, the first electrode has a longitudinal extension from 0.5 mm to 100 mm, especially from 3 mm to 50 mm, especially preferably from 5 mm to 30 mm, and/or a width extension from 0.5 mm to 50 mm, especially from 1.5 mm to 30 mm, especially preferably from 3 mm to 10 mm, wherein the longitudinal extension is in the gas flow direction (G) and the width extension is perpendicular to the gas flow direction (G).

Due to the specified longitudinal and/or width extension of the first electrode, a sufficiently large electrode area is provided so that the first electrode can reliably act as a suction electrode.

In a laminar gas flow, the charged particles need a certain time to flow over the first electrode, so that even such charged particles that are further away from the first electrode can hit the first electrode.

In a particularly preferred embodiment of the invention, the sensor according to the invention has such a resistive electrode structure, which does not have an interdigital capacitor structure (IDC). In particular, an IDC-structure is understood to be an arrangement of electrodes of this kind that intermesh. In such an arrangement of an electrode structure (IDC-structure), the electrodes typically each have a comb-like structure, whereby the electrodes are positioned in relation to each other in such a way that the combs intermesh. In other words, the combing tines of a first electrode are each positioned in the space between two combing tines of the second electrode and vice versa.

Furthermore, with this type of electrode arrangement (IDC-structure), it is possible that the individual electrodes have finger-like sections. It is intended that the fingers of a first electrode are positioned in the space between two fingers of the second electrode and vice versa.

According to the invention, the formation of IDC-structures, especially in the described options of comb-like or finger-like formation of the two electrodes, should therefore not be performed. In particular, it is essential for the invention that no such IDC-structure is formed, especially in the first section of the sensor.

A further aspect of the invention relates to a sensor system comprising a sensor in accordance with the invention. The sensor is arranged in an electrically conductive housing, which has a gas inlet opening and a gas outlet opening. The sensor is arranged in the housing in such a way that the first end face of the substrate facing towards the gas inlet opening and the second front side facing towards the gas outlet opening.

During a measuring mode of the sensor system, a first electric field is formed between the first electrode and the electrically conductive housing, this first electric field being unidirectional and a second electric field being formed between the first electrode and the second electrode.

In one embodiment of the invention, the housing is designed as an inner tube, which is arranged in an outer tube.

In a further embodiment of the invention, the outer tube has inlet openings, for example slot-shaped inlet openings, which are formed in the lateral surface in the longitudinal direction of the outer tube.

Another aspect of the invention relates to the use of a sensor and/or sensor system according to the invention for detecting soot particles in an exhaust system of a vehicle.

In connection with the sensor system according to the invention and/or in connection with the use according to the invention, there are similar advantages as those already mentioned in connection with the sensor according to the invention.

BRIEF DESCRIPTION OF THE DRAWINGS

The following schematic drawings show aspects of the invention for improving the understanding of the invention in connection with some exemplary illustrations, wherein.

DETAILED DESCRIPTION

The same reference numbers are used in the following for identical and similarly acting components.

Figure 2A:
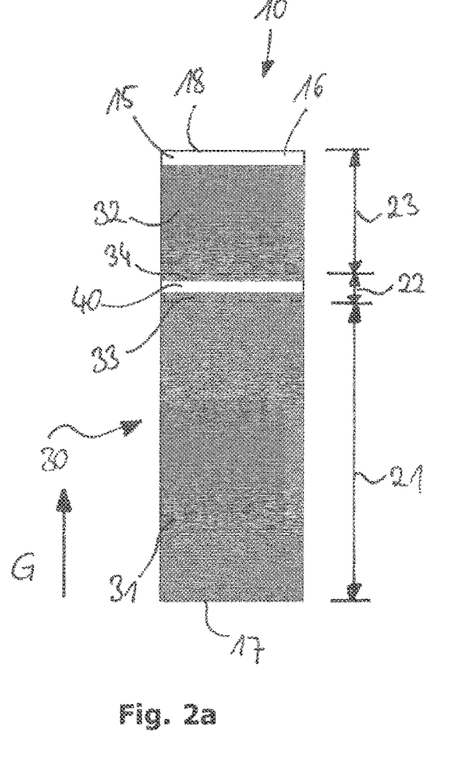
FIGS. 2a and 2b show top views of sensors according to the invention.
Figure 2B:
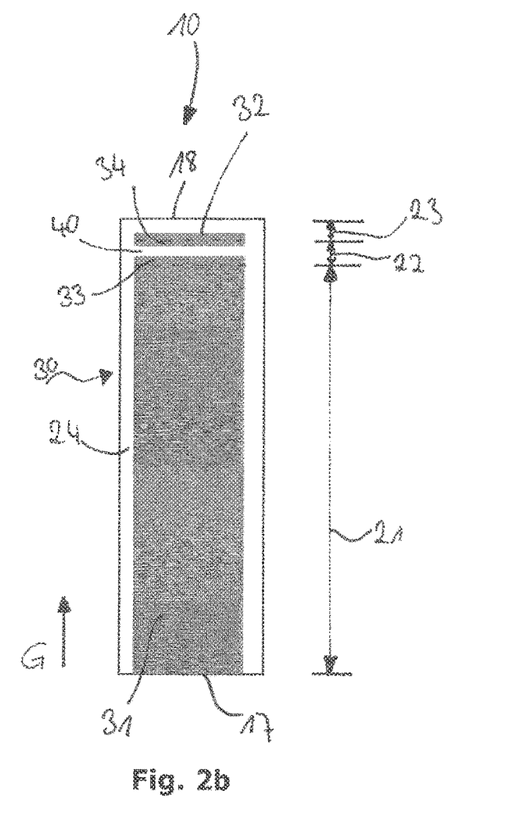

FIGS. 2a and 2b show the first simple embodiments of sensors 10 according to the invention. The sensors 10 are each based on cuboid substrates 15. The sensors 10 are shown in FIGS. 2a and 2b in top view. The top view is of a surface 16 of the substrate 15. Furthermore, a gas flow direction G is shown. This extends from a first front side 17 to a second front side 18.

The sensor 10 can be divided into three sections 21, 22 and 23. Starting from the first front side 17 of sensor 10, the first section 21, the second section 22 and the third section 23 are arranged one behind the other in gas flow direction G.

A first electrode 31 is located in the first section 21 of sensor 10. The first electrode 31 acts as a suction electrode.

In the second section 22 of sensor 10, also shown, a sensor detection region 40 is formed. The sensor detection region 40 is formed by a portion 33 of the first electrode 31 and a portion 34 of the second electrode 32, whereby the two portions 33 and 34 are spaced apart from each other.

The second electrode 32 is formed in a third section 23 of sensor 10.

It can be seen that in this example the longitudinal extension of the first electrode 31 is greater than the longitudinal extension of the second electrode 32. With the help of such a long version of the first electrode 31, a particularly effective suction electrode can be provided.

The sensor 10 has a resistive electrode structure 30, so that the conductive particles flowing in gas flow direction G are detected in the sensor detection region 40 according to known methods.

FIG. 2b shows another simply constructed embodiment of a sensor 10 according to the invention. On the surface 16 of the substrate 15, at least in sections, an edge 24 is formed. The edge 24 extends from the first section 21 to the third section 23 of sensor 10.

It can be seen that the second electrode 32 in the example shown is many times shorter than the first electrode 31. In other words, to form a sensor detection region 40 no large extension in the longitudinal direction or in the gas flow direction G of the second electrode 32 is necessary.

Figure 3:
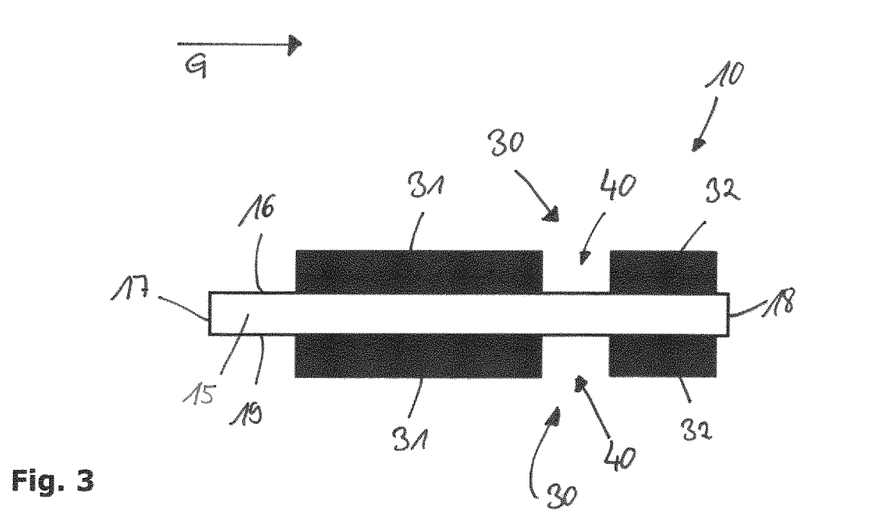
FIG. 3 shows a side view of another embodiment of a sensor according to the invention.

FIG. 3 shows another embodiment of the sensor 10 according to the invention. The substrate 10 has a resistive electrode structure 30 on both a first surface 16 and a second surface 19. Both electrode structures 30 each comprise a first electrode 31 and a second electrode 32.

This embodiment has the advantage that not only the conductive particles flowing over the first surface 16, i.e. the upper side of the sensor 10 are detected, but also the conductive particles flowing in the gas flow direction G along the second surface 19 or the lower side of the sensor 10.

Due to the arrangement of a resistive electrode structure 30 on the first surface 16 and the second surface 19 a resistive sensor 10 with increased sensitivity is provided. The first electrodes 31 can be switched together or separately. The second electrodes 32 can also be switched separately or together.

Figure 4:
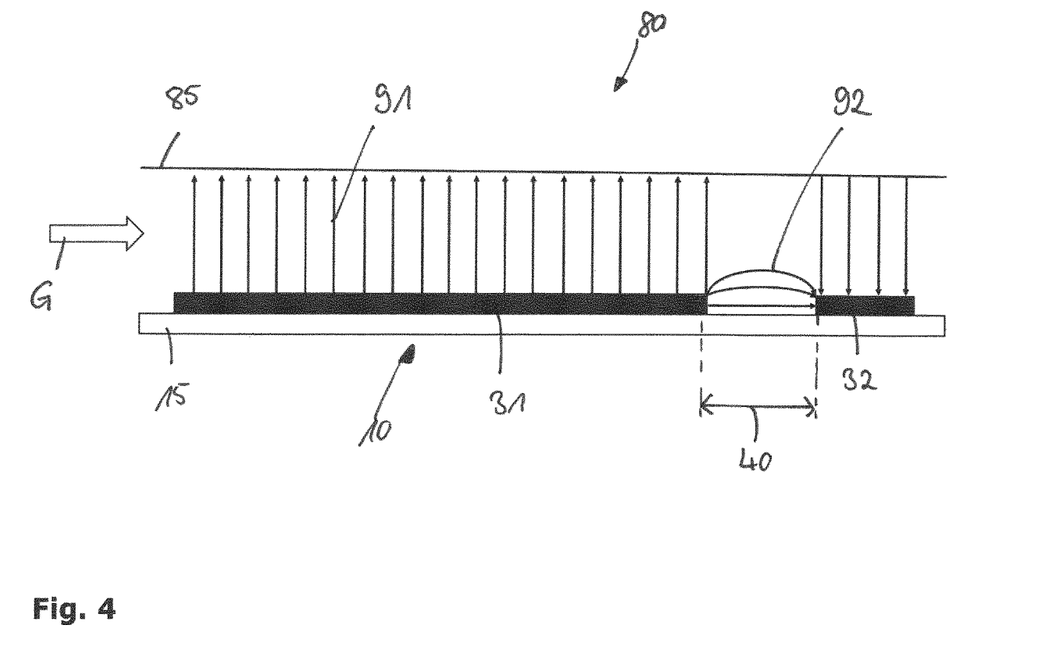
FIG. 4 shows the basic function of the sensor invention in a housing.

FIG. 4 shows the mode of action of the sensor 10 or the sensor system 80 according to the invention. The sensor 10 in accordance with the invention is located in an electrically conductive housing 85. In the side view, the first electrode 31 and the second electrode 32 can be seen. Furthermore, a sensor detection region 40 is formed. In the gas flow direction G, the second electrode is at least partially behind the first electrode 31. The two electrodes 31 and 32 are electrically insulated from each other.

The first electrode 31 is at positive or negative potential compared to the housing 85. The housing 85 and the second electrode 32 are at opposite electrical potential. The second electrode 32 and the housing 85 can be at the same electrical potential. For example, they can be at ground potential.

The narrow arrows shown in FIG. 4 indicate the direction of the electric fields between the first electrode and the housing 85 and between the first electrode 31 and the second electrode 32.

In other words, a first electric field 91 is formed between the first electrode 31 and the housing 85 and a second electric field 92 is formed between the first electrode 31 and the second electrode 32. Compared to the state of the art shown in FIG. 1, the first electric field is unidirectional.

A conductive particle in the gas flow with an electric charge opposite to the charge of the first electrode 31 is deflected towards the first electrode 31 or electrostatically attracted by it when flowing over the first electrode 31.

The first electrode 31 thus acts as a suction electrode and additionally increases the particle density on the first electrode 31, especially in the sensor detection region 40. In combination with the second electrode 32, a resistive electrode structure 30 is formed so that the particles deposited in the sensor detection region 40 can be detected.

Compared to the embodiment of the sensor known from FIG. 1, the electrical field generated bysensor 10 as shown in FIG. 4 is unidirectional and uniform. Consequently, the force acting on a charged particle attracted by the first electrode 31 is greater than in connection with the IDC structure shown in FIG. 1. Consequently, more charged particles are deposited on the flat first electrode 31 than in the embodiment shown in FIG. 1.

In addition, near-surface particles are transported to the sensor detection region 40 between the first electrode 31 and the second electrode 32. There the particles can form conductive particle filaments that reduce the electrical resistance between the first electrode 31 and the second electrode 32.

FIGS. 5a to 5j show different embodiments with regard to the resistive electrode structure 30.

Figure 5A:
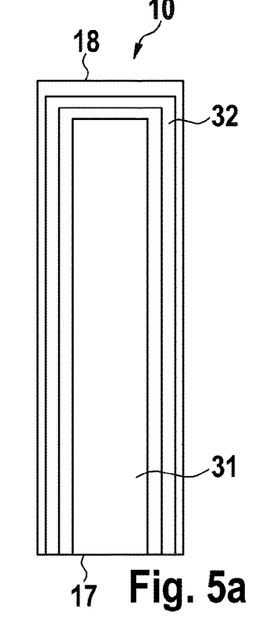
FIGS. 5a-5j show further designs of invented sensors in top view.

According to FIG. 5a, the first electrode 31 is rectangular. The second electrode 32, on the other hand, has a U-shape, whereby the second electrode 32 embraces the first electrode 31 at least in sections. In the area of the first front side 17, the first electrode 31 is not embraced by the second electrode 32. In addition, the second electrode 32 may be designed as a heating loop. The U-shaped second electrode 32 is designed as a circulating heating loop. Both ends of U-shaped second electrode 32 and the first electrode 31 can be individually, electrically contacted at first front side 17.

Figure 5B:
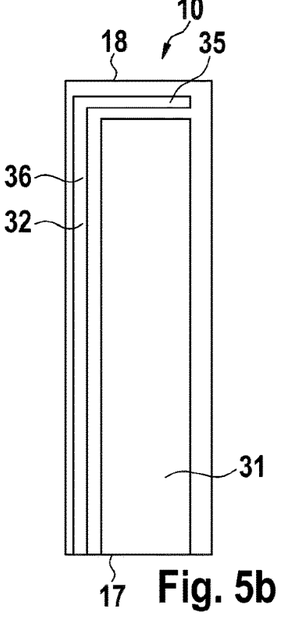

In FIG. 5b the first electrode 31 is again designed as a rectangular electrode. The second electrode 32 has an L-shape, with the short section 35 of the L-shape being formed in the third section 23 of sensor 20. The first electrode 31 and the second electrode 32 run parallel to each other at least in sections. Transverse to the gas flow direction G, the second electrode 32 with the short section 35 of the L-shape embraces the first electrode 31 at least in sections.

Figure 5C:
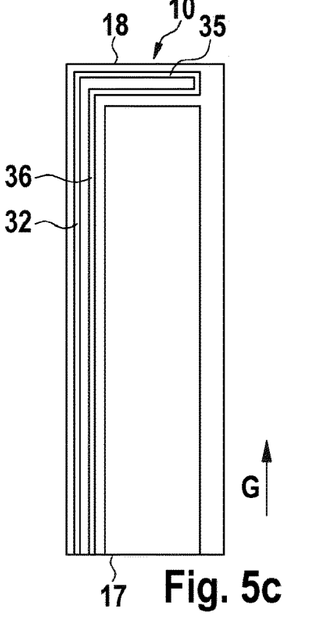

In FIG. 5c, the second electrode is designed as a heating loop compared to the embodiment shown in FIG. 5b. However, the second electrode 32 has an L-shape as shown in FIG. 5b.

Figure 5D:
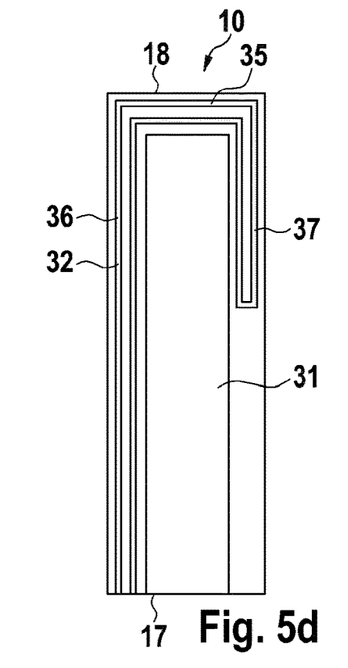

In FIG. 5d such a design is shown which, compared to the embodiment according to FIG. 5c, has an additional section 37 in the area of the second electrode 32. This additional section 37 has the effect that the first electrode 31 is surrounded to a greater extent by the second electrode 32 to allow a more uniform heating.

Figure 5E:
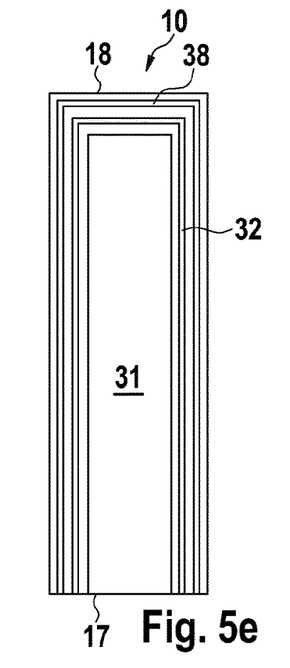

In FIG. 5e, the first electrode 31 has a rectangular shape. In addition to a first outer electrode 32, a further, third electrode 38 is formed. The second electrode 32 is U-shaped. The third electrode 38 encloses the second electrode 32 and is also U-shaped. The two outer electrodes 32 and 38 are not connected to each other and are each designed as heating loops.

Figure 5F:
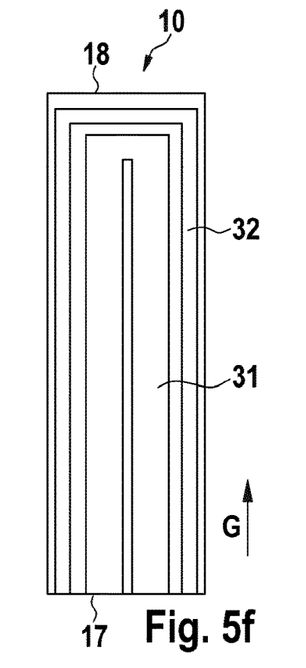

According to the embodiment of FIG. 5f, both the first electrode 31 and the second electrode 32 are designed in U-shape. Both electrodes are designed as heating loops.

Figure 5G:
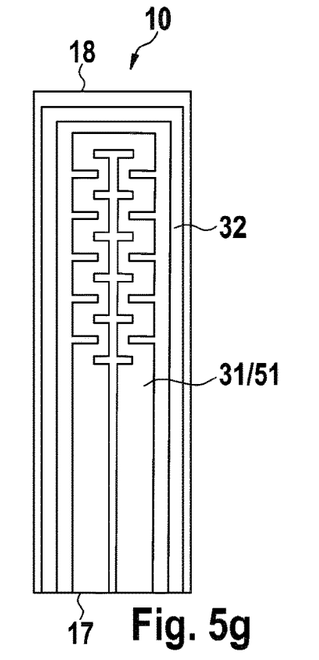

In FIG. 5g the second electrode is 32 U-shaped. The second electrode 32 is additionally designed as a circulating heating loop. The first electrode 31 has a meander shape 51 and is also designed as a heating loop. Due to the increased ohmic resistance, the first electrode 31 can also be used as a temperature sensor.

Figure 5H:
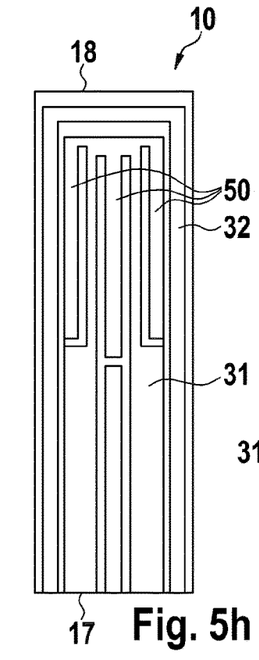

In FIG. 5h the second electrode 32 is designed as a U-shaped circulating heating loop. The first electrode 31 consists of a heating loop and equipotential surfaces 50, which are at the same electrical potential as the heating loop but are not connected as heating surfaces.

Figure 5I:
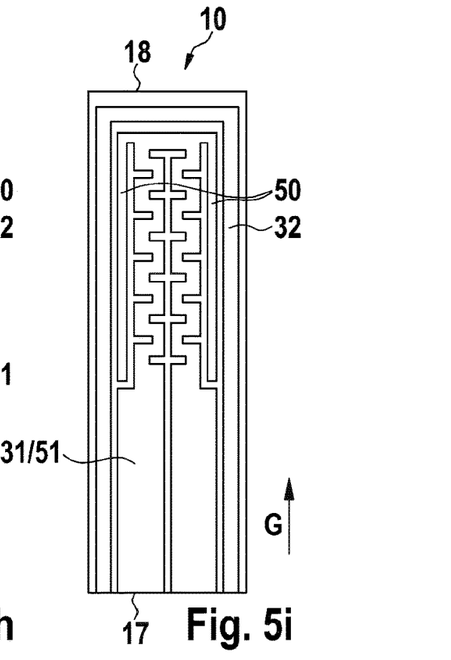

The embodiment according to FIG. 5i is a combination of the embodiments according to FIGS. 5g and 5h. The second electrode 32 has an U-shape. The first electrode 31 is designed as heating loop in meander shape 51 with lateral equipotential surfaces 50. The meandering heating loop 51 can alternatively be addressed as a temperature sensor.

Figure 5J:
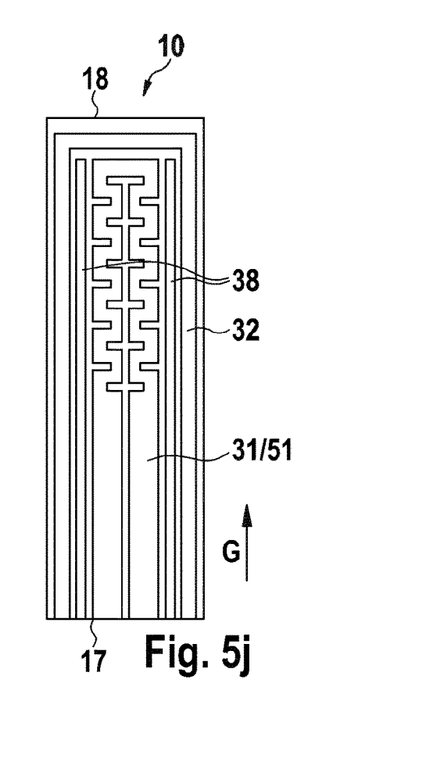

According to the embodiment shown in FIG. 5j, the second electrode 32 is again designed as a U-shaped circulating heating loop. The first electrode 31, however, has a meander shape 51. The heating loop designed in this way can alternatively be addressed as a temperature sensor.

Furthermore, two third electrodes 38 are formed. The third electrodes 38 are formed in gas flow direction G between the first electrode 31 and the second electrode 32. The third electrodes 38 can be connected to their own electrical potential to optimize the suction effect on the particles in the gas flow G.

It is possible to optionally combine the embodiment shown in FIGS. 5a to 5j.

FIGS. 6a to 6d show possible embodiments of a resistive electrode structure 30 in top view (left-hand illustration) and in side view A to A' (right-hand illustration), whereby the designs differ from each other with regard to the formation of a passivation layer 60.

Figure 6A:
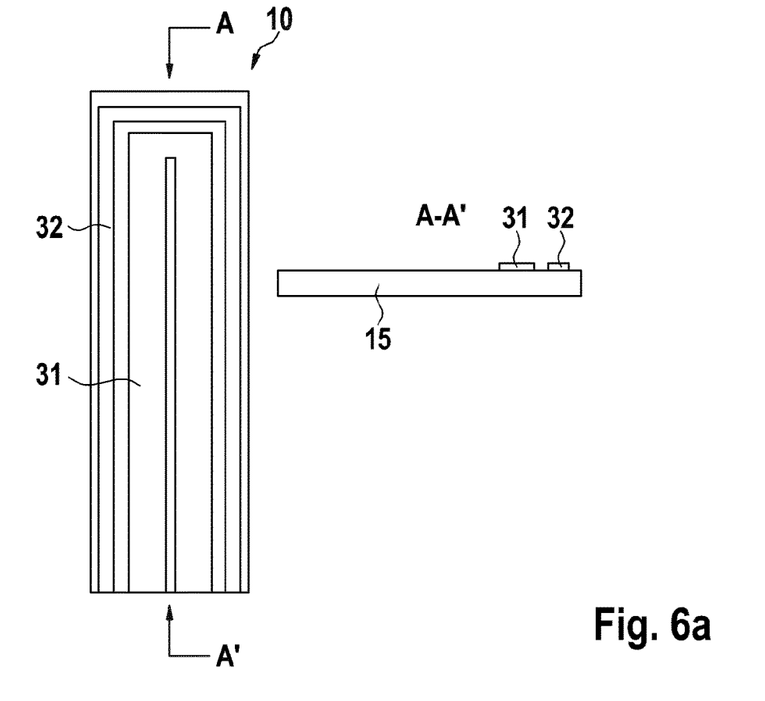
FIGS. 6a-6d show further embodiments of sensors according to the invention in top view as well as in sectional view with differently formed passivation layers.

The design as per FIG. 6a corresponds to the design as per FIG. 5f. No passivation layer is formed in embodiment shown.

Figure 6B:
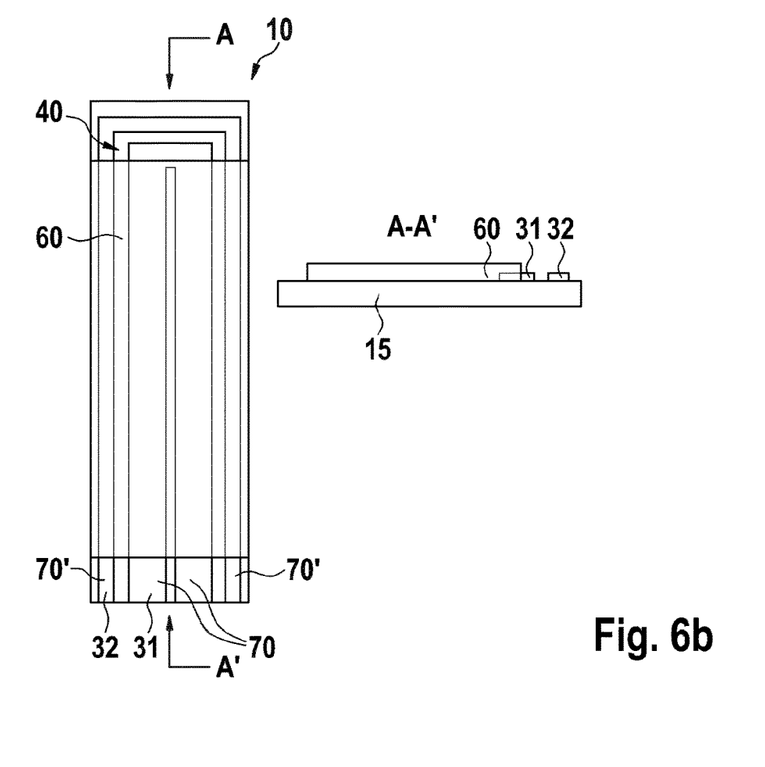

FIG. 6b shows that electrodes 31 and 32 are largely coated with a passivation layer 60. Only the sensor detection region 40, the third section 21 of sensor 10 and the contact pads 70, 70' of the two electrodes 31 and 32 are not coated with a passivation layer.

Figure 6C:
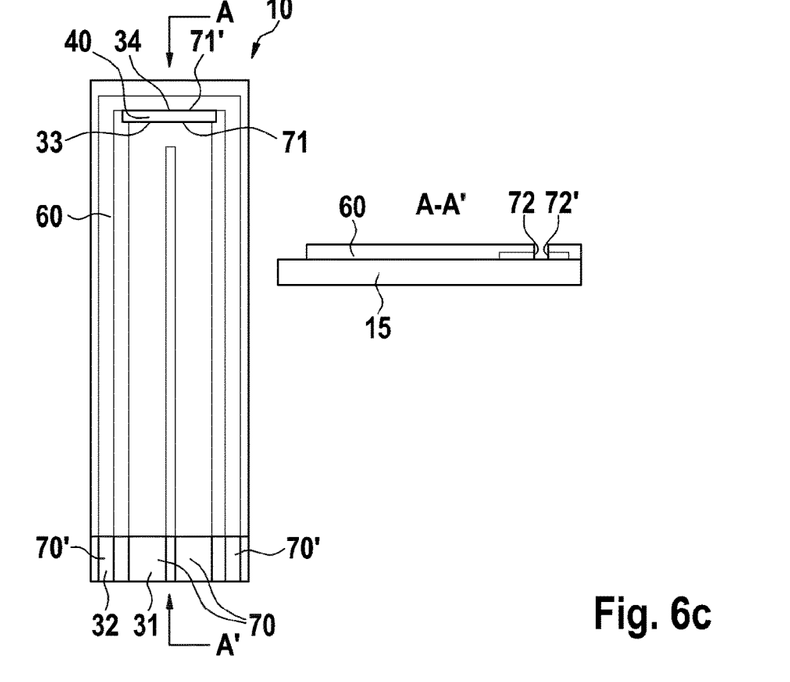

In the design as shown in FIG. 6c, the top sides 71, 71' of the first electrode 31 as well as the second electrode 32 are also provided with a passivation layer in the sensor detection region 40. Only the end faces 72 and 72' of portions 33 and 34 of the first electrode 31 and second electrode 32 are free of the passivation layer 60.

Figure 6D:
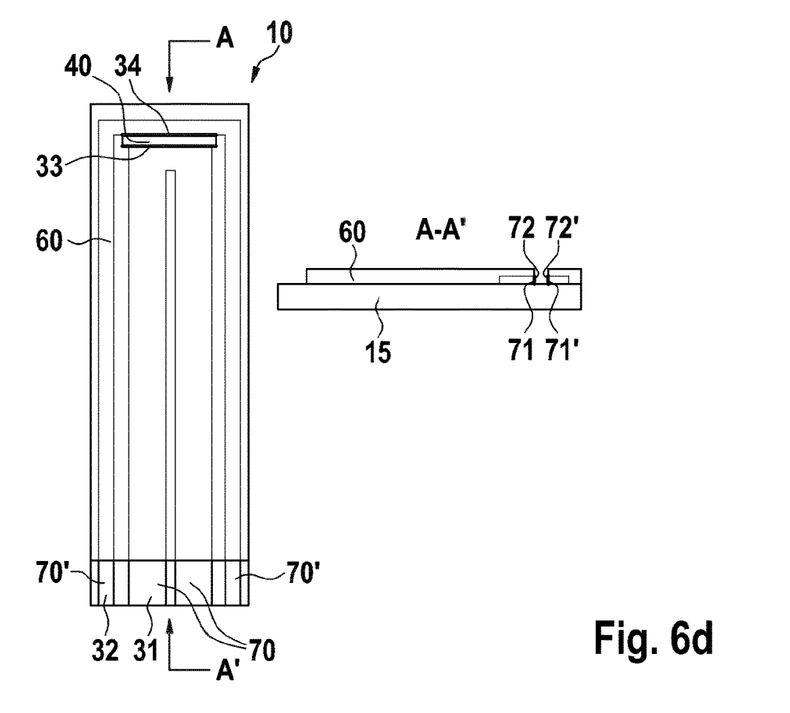

In the embodiment as shown in FIG. 6d, in the sensor detection region 40, not only the end faces 72 and 72' of portions 33 and 34, but also the top sides 71 and 71' are free of the passivation layer 60.

Using a sensor 10, as shown in FIG. 6d, i.e. with such a design in which both the top sides 71, 71' and the end surfaces 72 and 72' of electrode portions 33 and 34 are partially exposed, the growth of particle filaments forming from the first electrode 31 towards the second electrode 32 can be improved.

Such a sensor 10 can be manufactured by first applying a passivation layer 60 over the entire surface in the sensor detection region 40 and then removing it, for example by laser ablation or photolithographic etching.

The exposed portions of electrodes 31 and 32 also improve the discharge of the charged particles that hit them.

FIGS. 7a to 7d show embodiments of sensors 10, which have a substrate 15 with a cylindrical shape.

Figure 7A:
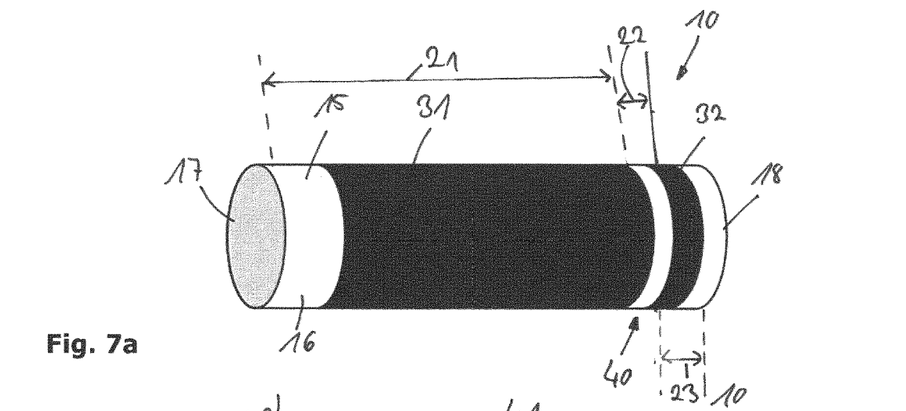
FIGS. 7a-7d shows different embodiments of sensors with cylindrical substrate.
Figure 7B:
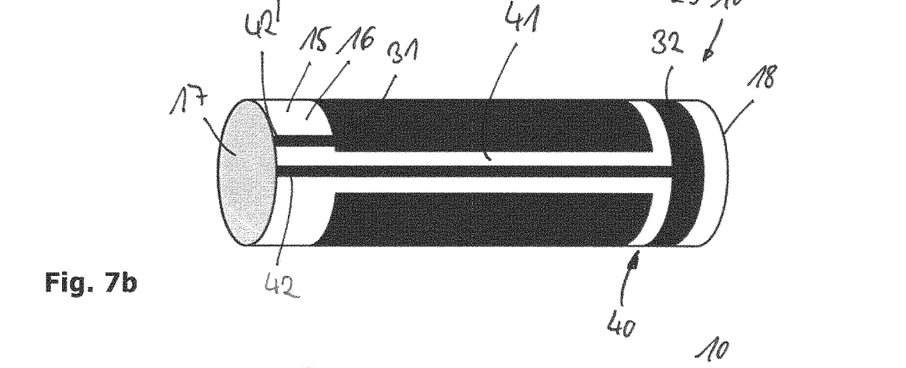
Figure 7C:
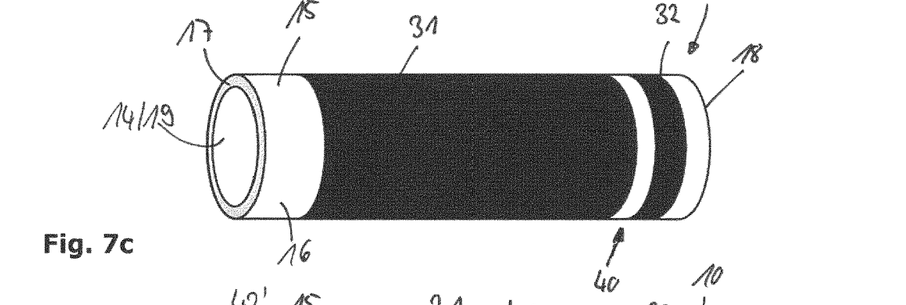
Figure 7D:
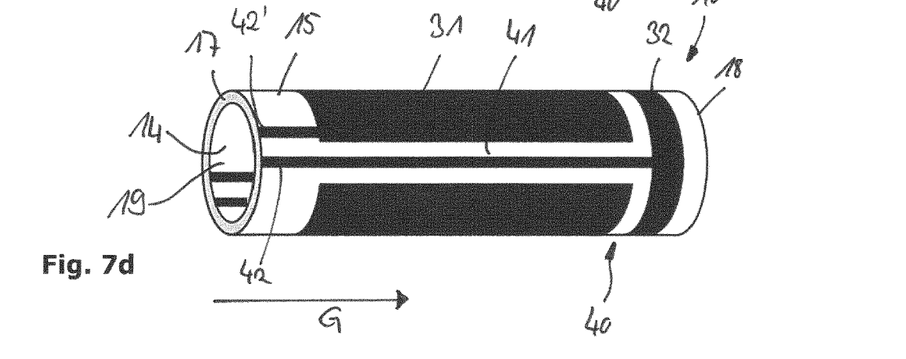

In FIGS. 7a and 7b, the substrate 15 is designed as a full cylinder. In FIGS. 7c and 7d, such embodiments of substrate 15 are shown which have a hollow cylinder shape.

In the gas flow direction G, a first electrode 31 is formed in a first section 21 and a second electrode 32 is formed in a third section 23 on the surface 16 of the substrate 10 as shown in FIG. 7a. The sensor detection region 40 is formed between the two electrodes 31 and 32. The electrodes 31 and 32 are located as circumferential electrodes on the surface 16 of the substrate 15. The two electrodes 31 and 32 are contacted, for example, by electrical leads that are connected to the surface of the electrodes 31 and 32 with a material bond.

An advantage of this embodiment is the symmetrical construction of the sensor 10, if the sensor 10 is placed in a tubular housing. The electric fields are radially symmetrical in a measuring mode, so that an accumulation of charged particles at the edges, as it can occur with cuboid-shaped substrates, is avoided. Furthermore, the sensor detection region 40 is increased for the same substrate size. The sensitivity of sensor 10 is thus increased.

In FIG. 7b the first electrode 31 is not formed on the entire circumference. Instead, the first electrode 31 has a recess 41 so that a section 42 of the second electrode 32 is guided towards the first front side 17 of the substrate 15. The section 42 of the second electrode 32 serves as a kind of lead of the second electrode 32. The first electrode 31 has a lead 42'.

This allows the electrodes 31 and 32 and their leads 42 and 42' to be manufactured together in one step. This can be done by means of cylinder screen printing, for example. Alternatively, it is possible to apply an insulating layer to a part of the first electrode 31 in order to electrically separate the lead 42 of the second electrode 32 in the direction of the first front side 17 of the substrate 15 from the first electrode 31.

The resistive electrode structure 30 of FIG. 7c corresponds to the resistive electrode structure 30 of the embodiment shown in FIG. 7a. The only difference is the hollow-cylindrical design of the substrate 15. Such a hollow-cylindrical design of the substrate 15 allows variable possibilities regarding the contacting of the electrodes 31 and 32. For example, feedthroughs can be formed through the substrate 15. Furthermore, the substrate 15 can be better connected to a housing (not shown). The connection can be made, for example, by plugging it onto a mandrel.

According to the embodiment shown in FIG. 7d, the possibility is indicated that the inside 14 of the substrate 15 can also be used as sensor area too. The electrode structure on the surface 16 of substrate 15 corresponds to the electrode structure 30 shown in FIG. 7b.

If a resistive electrode structure 30 is formed not only on the surface 16 but also on the inside 14 of the substrate 15, the sensor detection range 40 is increased by a factor of approximately 2. In the example shown, the inside 14 of substrate 15 acts as the second surface 19 of substrate 15.

Figure 8A:
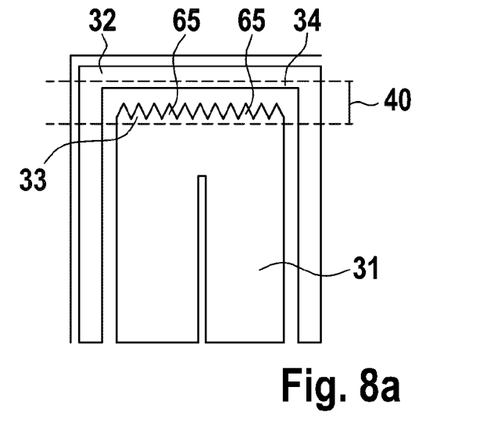
FIGS. 8a and 8b show special embodiments of sensors in the sensor detection region in top view.
Figure 8B:
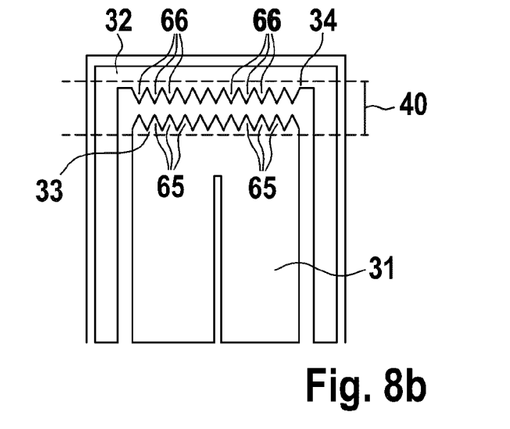

FIGS. 8a and 8b indicate that the first electrode 31 and/or the second electrode 32 may have 40 peaks 65 or 66 in the sensor detection region 40.

In the embodiment as shown in FIG. 8a, only the first electrode 31 in portion 33 has peaks 65.

According to the embodiment shown in FIG. 8b, peaks 65 and 66 are formed both in electrode portion 33 and in electrode portion 34. The peaks 65 and 66 are designed opposite and facing each other. Tips 65 and 66 are designed to generate electrical field enhancement. This increases the sensitivity of the sensor 10.

Figure 9A:
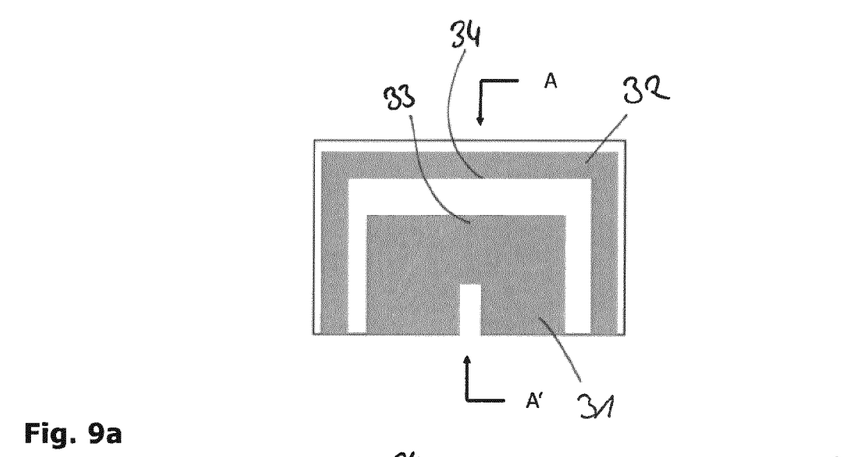
FIGS. 9a-9g show in sectional views the formation of the electrode sections in the sensor detection region, partly with applied passivation layer.

In FIGS. 9b to 9g, different embodiments are shown in side view A to A', whereby the portion is performed according to the position shown in FIG. 9a, with regard to the formation of the electrode portions 33 and 34 in the sensor detection region 40.

Figure 9B:
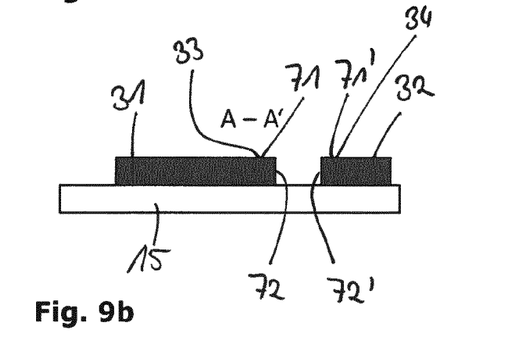

According to the embodiment shown in FIG. 9b, both portions 33 and 34 are free of a passivation layer. The end faces 72 and 72' run essentially in a straight line.

Figure 9C:
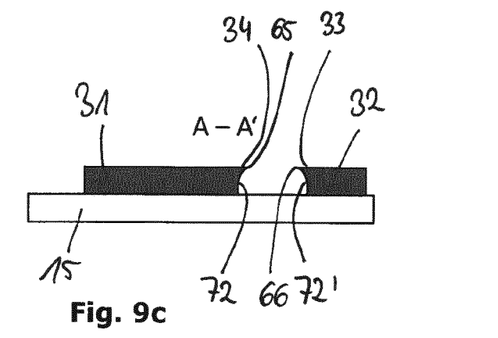

In FIG. 9c it is indicated that the electrode portions 33 and 34 in the sensor detection region 40 are structured by etching in such a way that peaks 65 and 66 are constructed to enhance the electrical field. The end faces 72 and 72' are curved in the present case.

Figure 9D:
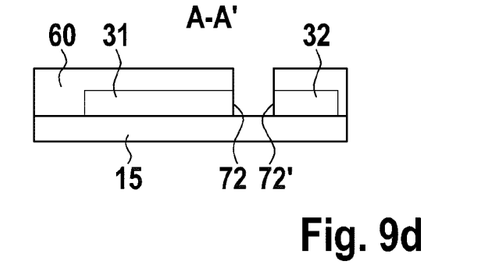
Figure 9E:
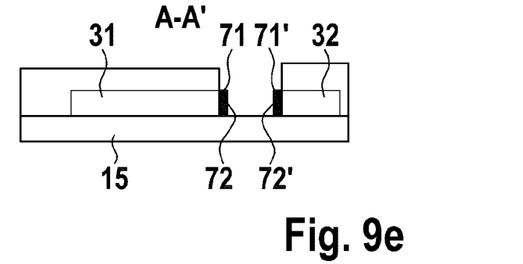

The embodiments according to FIGS. 9d and 9e correspond to the enlarged illustrations according to FIGS. 6c and 6d. Accordingly, the passivation layer 60 can be applied to the electrodes 31 and 32 in such a way that, for example, only the end faces 72 and 72' are exposed, or both the end faces 72 and 72' and the top sides 71 and 71' are exposed.

Figure 9F:
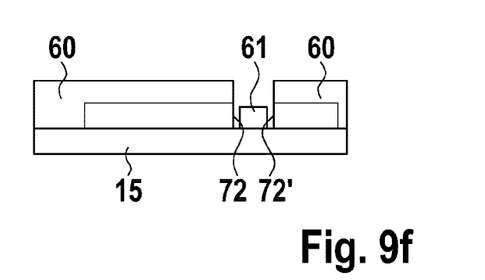

FIG. 9f shows that a passivation strip 61 which is formed in the sensor detection region 40. The passivation strip 61 is spaced from both the first electrode 31 and the second electrode 32.

Figure 9G:
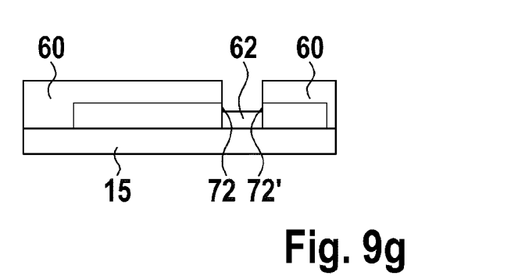

In FIG. 9g, however, a fill 62 is shown, which consists of a passivation material. In this embodiment, the end faces 72 and 72' of the electrodes 31 and 32 are only partially free of passivation material or passivation layer 60.

Figure 10:
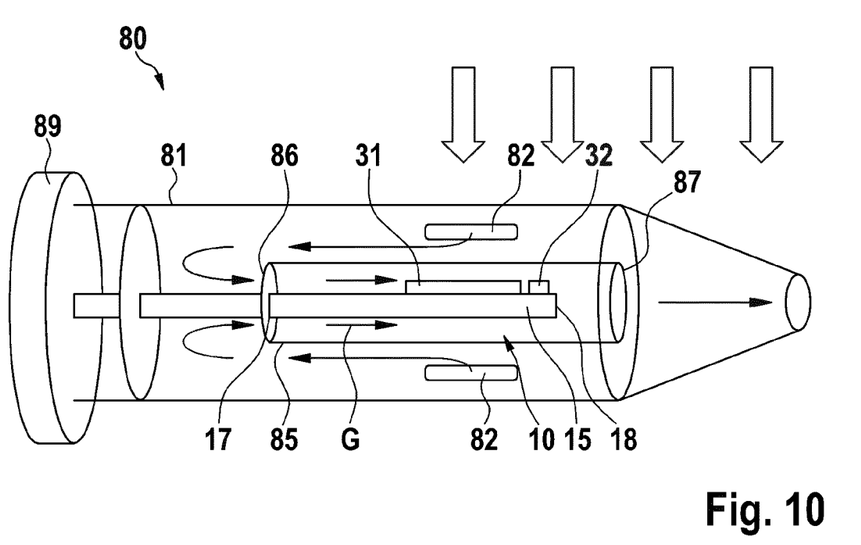
FIG. 10 shows a sensor system according to the invention.

FIG. 10 shows a possible embodiment of a sensor system 80 with a sensor 10 according to the invention.

The sensor 10 is arranged in a housing 85. The sensor 10 is arranged in such a way that the first front side 17 points towards a gas inflow opening 86 of the housing 85. The second front side 18 points in the direction of a gas outflow open 87 of the housing 85. The housing 85 is electrically conductive, whereby the housing 85 in the example shown is designed as an inner tube.

This inner tube or housing 85 is arranged in an outer tube 81. The outer tube 81 has inlet openings 82. In the example shown, the inlet openings 82 are slot-shaped and extend in the longitudinal direction of the outer tube 81.

In order to be able to arrange the sensor system 80 in an exhaust system, for example, the sensor system 80 has a screw connection 89. Alternative designs to the shown screw connection 89 are also conceivable and possible.

The gas to be analyzed flows through the inlet opening 82 into the outer tube 81, then the gas flow is directed 180 degrees into the housing 85 and then laminarly flows over the sensor 10 in the direction of the gas outflow opening 87.

The gas outflow opening 87 is perpendicular to the gas flow G and thus draws the analyzed gas away from the sensor 10. The additional application of a temperature sensor and/or a heater on the substrate 15 is possible. Especially an integration of the two elements in connection with the first electrode 31 or the second electrode 32 is possible.

The features disclosed in the claims, the specification, and the drawings may be essential for different embodiments of the claimed invention, both separately and in any combination with each other.

REFERENCE NUMBERS

1 Sensor system (state of the art)
2 Substrate (state of the art)
3 Resistive electrode structure (state of the art)
4 First combed electrode (state of the art)
5 Second combed electrode (state of the art)
6 Sensor (state of the art)
7 Housing (state of the art)
10 Sensor
14 Inner side
15 Substrate
16 First surface
17 First front side
18 Second front side
19 Second surface
21 First section
22 Second section
23 Third section
24 Edge section
30 Resistive electrode structure
31 First electrode
32 Second electrode
33 Portion of the first electrode
34 Portion of the second electrode
35 Short section
36 Long section 37 Additional section
38 Third electrode
40 Sensor detection region
41 Recess
42 Part of second electrode
42' Lead first electrode
50 Equipotential area
51 Meander
60 Passivation layer
61 Passivation strip
62 Fill
65 Peak first electrode
66 Peak second electrode
70, 70' Contact pad
71, 71' Top side
72, 72' End face
80 Sensor system
81 Outer tube
82 Inlet opening
85 Housing
86 Gas inflow opening
87 Gas outflow opening
89 Screw connection
91 First electric field
92 Second electric field
G Gas flow direction

The invention claimed is:

1. A sensor for detecting charged particles in a gas flow, comprising a substrate having a cuboid or cylindrical shape having a first and a second front side, wherein a gas flow direction is defined as extending in direction from the first front side of the substrate to the second front side of the substrate, wherein a resistive electrode structure comprising at least two electrodes is formed at least on one surface of the substrate, the at least two electrodes are electrically separated from one another, wherein in relation to the gas flow direction, a first electrode is arranged in a first section of the sensor and is designed in such a way that the first electrode acts as a suction electrode, wherein the suction electrode is configured to be switched such that charged particles are attracted; wherein a sensor detection region is formed in a second section of the sensor, whereby the sensor detection region is formed by a portion of the first electrode and a portion of a second electrode, which is spaced apart from the portion of the first electrode, wherein the second electrode is formed at least partially in a third section of the sensor; where the suction electrode is placed in front of the sensor detection region in view of the gas flow, and charged particles carried in the gas flow are forced by an attracting potential of the suction electrode towards the suction electrode, whereby volatile particles on or slightly above the suction electrode will be purged by the gas flow towards the sensor detection region and contribute to a resistive change between first and second electrode; wherein the second electrode is formed as a heating element and the resistive electrode structure has no interdigital capacitor structure (IDC), wherein the sensor has only a single sensor detection region, and a gap between the first electrode and the second electrode in the sensor detection region is oriented essential perpendicular to the gas flow direction and is slit-shaped, wherein the width of the gap is at most 70 μm and at least 20 μm, wherein the area covered by the suction electrode (ASE) is larger than the area between the first electrode and the second electrode in the sensor detection region (ADR) and the ratio of ASE to ADR is at least 50.

2. The sensor according to claim 1, wherein the first electrode and/or the second electrode are coated in sections with a passivation layer, whereby at least the sensor detection region is at least partially free of the passivation layer.

3. The sensor according to claim 1, wherein the second electrode has a rectangular shape or an U-shape or a L-shape.

4. The sensor-according to claim 1, wherein the first electrode has a rectangular shape or an U-shape.

5. The sensor-according to claim 1, wherein at least one third electrode formed between the first electrode and the second electrode or formed at least partially surrounding the second electrode.

6. The sensor according to claim 1, wherein the first electrode has a longitudinal extension from 0.5 mm to 100 mm, and/or a width extension from 0.5 mm to 50 mm, wherein the longitudinal extension is in the gas flow direction and the width extension is perpendicular to the gas flow direction.

7. A sensor system-comprising a sensor-according to claim 1, whereby the sensor is arranged in an electrically conductive housing having a gas inflow opening and a gas outflow opening, wherein the first front side of the substrate is arranged facing in the direction of the gas inflow opening and the second front face of the substrate is arranged facing in the direction of the gas outflow opening.

8. The sensor system-according to claim 7, wherein, during a measuring mode of the sensor system the first electrode and the electrically conductive housing are configured to form a first electric field between them that is unidirectional, and wherein the first electrode and the second electrode are configured to form a second electric field between them.

9. The sensor system-according to claim 7, wherein the housing is designed as an inner tube which is arranged in an outer tube.

10. The sensor system-according to claim 9, wherein, the outer tube has inlet openings formed in the lateral surface in the longitudinal direction of the outer tube.

11. The sensor according to claim 1 configured in the exhaust system of a vehicle for detecting soot particles.

12. The sensor system according to claim 7 configured in the exhaust system of a vehicle for detecting soot particles.

* * * * *